United States Patent [19]

Zahid

[11] 4,164,639
[45] Aug. 14, 1979

[54] METHOD OF FORMING A PRESSURE ACCUMULATOR

[76] Inventor: Abduz Zahid, 2424 Jupiter Dr., Los Angeles, Calif. 90046

[21] Appl. No.: 878,281

[22] Filed: Feb. 16, 1978

Related U.S. Application Data

[62] Division of Ser. No. 685,315, May 11, 1976, Pat. No. 4,098,297.

[51] Int. Cl.² ............................................. B23K 11/08
[52] U.S. Cl. ................................. 219/117.1; 219/107
[58] Field of Search ...................... 219/117.1, 107, 105; 138/26, 30; 220/85 B

[56] References Cited

U.S. PATENT DOCUMENTS

| 1,982,850 | 11/1934 | Banks | 219/107 |
| 3,847,182 | 11/1974 | Greer | 138/30 |
| 3,907,000 | 9/1975 | Carr | 138/30 |
| 3,925,637 | 12/1975 | Becker | 219/105 |

FOREIGN PATENT DOCUMENTS

1188681 4/1970 United Kingdom ..................... 219/107

Primary Examiner—Roy N. Envall, Jr.
Assistant Examiner—Keith E. George

Attorney, Agent, or Firm—Arthur B. Colvin

[57] ABSTRACT

A method of forming a pressure accumulator is disclosed which comprises the steps of advancing a cylindrical resilient metallic sleeve carrying a separator or bladder through the open mouth of a shell forming a part of the casing of the accumulator, the shell including on an inner wall surface thereof an annular groove defining an inwardly directed sharpened lip in the casing wall. The sleeve is positioned such that the outer circumference thereof, adjacent its upper end, is disposed in abutting relation to the said lip. An electrode is placed against the upper end of the sleeve opposite the lip at a position remote from the deformable bladder. The shell section and the electrode are relatively rotated about an axis of revolution coincident with the longitudinal axis of the shell while electrical current is passed through the electrode, sleeve, and into the casing, the current flow being sufficient to induce a melting and consequent fusion between components of the metal forming the sleeve and lip portion, whereby the sleeve is secured to the shell section and a seal is defined by the annular fused portions of the shell and the sleeve. Thereafter the open mouth portions of the shells are welded together to define a completed casing.

5 Claims, 5 Drawing Figures

METHOD OF FORMING A PRESSURE ACCUMULATOR

This application is a division of copending application Ser. No. 685,315, filed May 11, 1976, now U.S. Pat. No. 4,098,297 issued July 4, 1978.

This invention relates to the method of forming pressure vessels, more particularly to the method of forming a pressure accumulator of the type having a rigid casing with a deformable separator therein in the form of a bladder dividing the vessel into two chambers, one of which is charged with gas under pressure and the other of which is charged with oil under pressure.

The casings of pressure accumulators of the type described are typically fabricated of separate halves or shells having open mouth ends and closed ends which may be hemispherical. The end portion of one said shell has mounted therein a fluid port for the admission of oil, whereas the other end carries a gas charging valve.

In accordance with standard practice, the separator is typically secured to an annular metallic sleeve and may be molded to a portion of the sleeve. The metallic sleeve is thereafter secured within one of the shell halves, as by welding or by some other fastening procedure. The assembly is completed by connecting the shell halves, as by an annular weld.

Substantial difficulties have been encountered in mounting the sleeve carrying the separator within the shell. The sleeve must be accurately positioned and securely fixed against axial movement within the shell and, in addition, the connection must be leakproof to preclude the passage of fluids around the separator.

In accordance with one method of locating the sleeve, an annular weld is formed between an inner wall portion of the shell and the sleeve. Problems have arisen in the formation of such welds since, unless the weld forms a complete seal, leakage between the sleeve and the inner wall may be experienced. On the other hand, the substantial heat generated in the course of formation of the weld may be transmitted through the casing and sleeve to the separator or bladder, which is typically formed of an elastomeric material and, hence, subject to degradation and destruction by heat.

It is accordingly a principal object of the invention to provide a method of manufacturing a pressure accumulator device wherein the mounting of the bladder retainer sleeve within the casing is simplified, to assure formation of an effective seal while minimizing heat transmission to the elastomeric separator member.

More specifically, it is among the objects of the present invention to provide a simplified and improved method for attaching a separator support sleeve carrying an elastomeric bladder to an inner wall portion of the casing while minimizing the possibility of damage to the separator, by forming in the inner wall portion an annular groove defining an inwardly facing lip. The retainer sleeve end, which is remote from the portions of the sleeve to which the separator is attached, is aligned with the lip, the noted portions being in intimate engagement.

Thereafter, a fused connection is formed between the noted parts by positioning a welding electrode against the inner circumference of the sleeve, preferably at a corner portion, and causing a welding current to flow through the electrode, sleeve, and to the grounded casing at an area of relatively small cross section, the welding current being sufficient to fuse the reduced cross section portion of the sleeve to the lip and lip-adjacent wall portion. During the flow of welding current, a relative rotation of the electrode and shell is effected whereby the heat generated at any one increment is greatly reduced, minimizing the possibility of damage to the separator.

A further object of the invention lies in the provision of an improved pressure accumulator device formed by the above method.

According to the invention, these objects are accomplished by the arrangement and combination of elements hereinafter described and more particularly recited in the claims.

In the accompanying drawings, in which are shown two of various possible embodiments of the several features of the invention:

Figure 1:
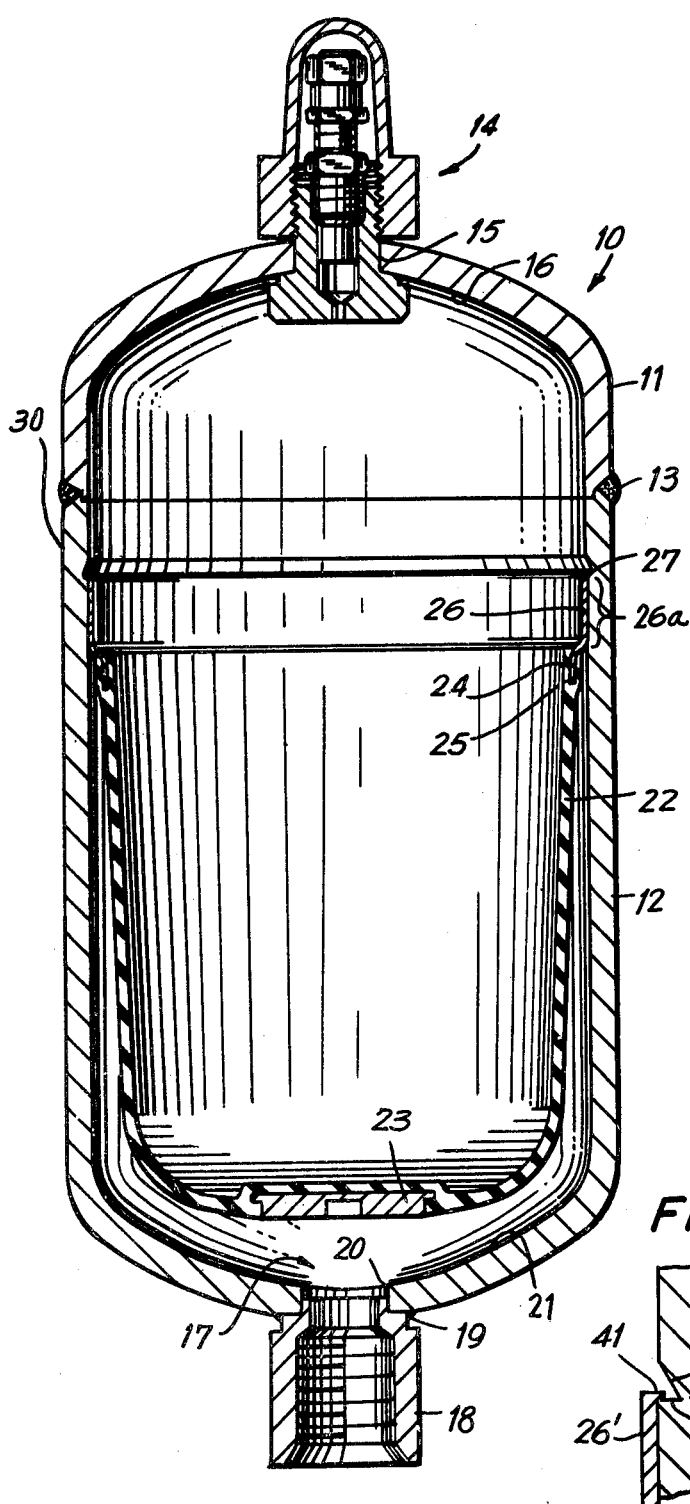
FIG. 1 shows a longitudinal sectional view of a pressure accumulator in accordance with the invention.

Referring now to the drawings, the accumulator 10 comprises a generally cylindrical casing or pressure vessel formed of an upper shell component 11 and a lower shell component 12, the shell components being connected together by an annular weld 13. The shell components 11, 12 are formed of rigid material, such as steel, capable of withstanding the high pressures to which the accumulator will be subjected in use.

As is conventional, the accumulator includes a gas charging valve 14 extending through a circular aperture 15 in the closed end portion 16 of the upper shell 11. The fluid port 17 may include a fitting 18, secured as by weld 19 in an aperture 20 in the closed end 21 of the lower shell section 12.

The usual deformable bladder or separator 22 of natural or synthetic rubber includes a rigid valve member 23 at the lower end thereof, it being understood that the function of the member 23 is to prevent extrusion of the bladder through the oil port 17. In the distended position of the bladder or partition 22, the valve ember 23 seats over the port to seal the same.

The upper end of the bladder 22 includes a thickened rim 24 which may be molded over retainer shoulder 25 of the partition retainer sleeve 26. The partition retainer sleeve 26 is preferably formed of a resilient metallic material compatible with, i.e., fusible to, the metal of the casing.

The principal advance of the present invention resides in the manner in which the sleeve 26 is secured to the shell section 12 to provide the requisite sealing against passage of fluids across the junction of sleeve and casing, and to prevent axial movement of the sleeve within the shell section 12.

Figure 2:
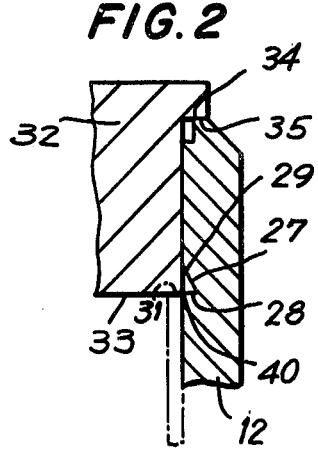
FIG. 2 is a fragmentary sectional view of the components at an intermediate stage of assembly.
Figure 3:
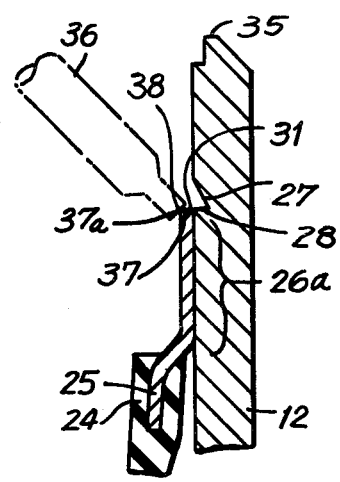
FIG. 3 is a fragmentary view at a further stage in the assembly.
Figure 5:
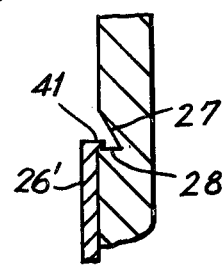
FIG. 5 is a sectional view of an embodiment at a stage similar to that of FIG. 3.

The section 12, in an inner wall portion thereof, is formed with an annular groove 27, the configurations of which are best understood from an inspection of the enlarged fragmentary views FIGS. 2, 3 and 5.

The groove 27, which may be triangular in vertical section, include an upwardly facing shoulder portion 28 and an inclined side wall portion 29. The sleeve 26 is positioned by inserting the same through the open mouth 30 of lower shell section 12 and shifting the same downwardly until the upper end 31 of the sleeve is in essentially precise alignment with the upwardly facing shoulder portion 28 of the groove 27.

The diameter of the sleeve 26 is calculated to provide an intimate interference or frictional fit with the interior diameter of the shell section 12 and is preferably urged into the desired aligned position shown in FIG. 2 (wherein the sleeve appears in dot and dash lines) by a jig or insertion tool 32.

The tool 32 includes a base portion 33, the radial outermost portions of which engage against the top surface 31 of the sleeve. The tool 32 includes an outwardly extending shoulder 34 which, when moved downwardly, seats against the upper edge 35 of the shell section 12, the spacing between shoulder 34 and base 33 being adjusted precisely heightwisely to orient the sleeve 26 in the shell.

After positioning by the tool 32, the parts will have reached the position shown in FIG. 3.

Connection between the sleeve 26 and shell section 12 is effected by an electrical fusion process which is well known per se, such process involving the passage of high current from electrode 36 which is connected to the "hot" terminal of a welding transformer, to the casing or shell section 12 connected to the ground terminal of the transformer.

As best seen in FIG. 3, the upper end portion 37 of the sleeve 26 preferably includes a square corner 37a against which the lower edge 38 of the electrode 36 is pressed. A spring loading action of the electrode in the direction of the axis thereof may be provided to assure outward flow of the metal.

During the flow of current through the electrode 36, a relative rotation between the electrode and shell section 12 is effected, such rotation being about an axis coincident with the vertical axis of the shell section 12. It will be understood that such rotation may be accomplished by rotating a jig or like support carrying the shell 12 while the electrode is maintained in fixed position, or by rotating the electrode with the shell section maintained stationary.

The current flow will result in a progressive melting and fusion of the metal portions, particularly the upper end portion 37 engaged by the electrode and the adjacent inner edge 40 of shoulder 28, such reduced end portion 37 and edge 40 being the components of highest resistance in the electrical circuit and, hence, the area of principal voltage drop and heat concentration.

Figure 4:
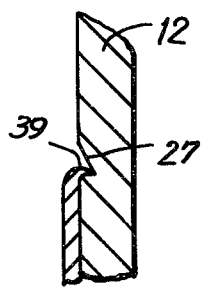
FIG. 4 is a view similar to FIG. 3 after fusion of the parts.

Following relative rotation of the electrode and shell section 12, a fused connection will be developed between the sleeve 26 and wall portions within groove 27, substantially as represented, by way of example, in FIG. 4.

The amount of current flow and speed of rotation must be tailored to the requirements of the particular embodiment, being varied in accordance with such factors as thickness of material, composition of material, etc., optimal conditions being readily determined.

Due to the concentration of heat in a limited area, as hereinabove set forth, and the constant rotation of the components, plus the fact that the thicker shell section 12 acts in the manner of a heat sink, the heat transmitted downwardly through sleeve 26 to the partition is insufficient to damage the elastometic partition. As shown in the drawings, and particularly FIGS. 1 and 3, there is metal to metal contact between the cylindrical side portions 26a of sleeve 26 and the inner wall of shell 12 over a substantial area, thereby augmenting the dissipation of heat.

Following fusion, the material of the sleeve 26 defined at the junction of the upper end of sleeve 26 and the innermost radial portion 40 of the shoulder 28 will have become integrated, essentially as shown at 39 in FIG. 4. The fusion line or area 39 provides a continuous annular seal while at the same time securely locking the sleeve against axial shifting movement relative to the shell section 12.

In the embodiment of FIG. 5, wherein like parts have been given like reference numerals, the components are essentially the same as described, except that the spring sleeve 26' is provided with a radially outwardly extending ledge 41 which is inwardly deflected in the course of insertion and which hooks over the shoulder 28 when the ledge is brought into registry with groove 27 to facilitate location of the sleeve 26' relative to the shell section 12. The positioning of the sleeve 26', by reason of the automatic locating feature, may be manually effected or may be effected through the use of a tool, such as the tool 32.

A pressure accumulator having the structural characteristics hereinabove set forth and fabricated in accordance with the method described is particularly suited to automated manufacture, resulting in reduced fabrication costs. In addition, the possibility of overheating and consequent failure of the bladder is minimized.

As noted, after the sleeve 26 and attached portion 22 have been assembled, the final weld 13 between the shell sections 11 and 12 is effected to complete formation of the pressure resistant casing.

It will be readily recognized that variations of the above methods may occur to those skilled in the art in the light of the teachings hereof. According, the invention is to be broadly construed within the scope of the appended claims.

Having thus described the invention and illustrated its use, what is claimed as new and is desired to be secured by Letters Patent is:

1. The method of manufacturing a pressure accumulator device having a casing which is circular in section, said casing being formed of two metal shells, each having an open end and a closed end for the reception of a fluid inlet port and a gas charging valve, respectively, the steps of forming in an internal wall portion of one said shell section, in spaced relation below the open end thereof, an annular groove lying in a plane normal to the longitudinal axis of said shell section to define, at the junction of said wall portion and groove, an inwardly directed shoulder portion, positioning in said shell section having said groove a resilient cylindrical metal sleeve member having an annular first end portion and a second end portion supporting a bladder at a position within said shell whereat said first end portion is disposed immediately adjacent said shoulder portion, positioning an electrode against an interior increment of said first end portion of said sleeve, and causing said electrode progressively to scan the inner circumference of said first end portion while simultaneously inducing a current flow through said electrode, first end portion, and shell, thereby to form an annular fused connection between said first end portion and portions of said sleeve defining said groove, providing a continuous annular seal, and thereafter connecting said open end portions of said shells.

2. The method in accordance with claim 1 wherein said scanning movement of said electrode and said first end portion of said sleeve is effected by relatively rotating said electrode and sleeve about an axis of rotation coincident with the longitudinal axis of said shell.

3. The method in accordance with claim 2 wherein said electrode is yieldingly urged outwardly against said first end portion of said sleeve, thereby to deflect fused metal toward said groove.

4. The method in accordance with claim 1 wherein said first end portion of said sleeve includes at its inner circumference a reduced cross section edge portion defining a high resistance area, and said electrode engages against said edge portion.

5. The method in accordance with claim 4 wherein said groove includes a sharpened lip portion adjacent said first end of said sleeve.

* * * * *

UNITED STATES PATENT OFFICE
CERTIFICATE OF CORRECTION

PATENT NO. : 4,164,639
DATED : August 14, 1979
INVENTOR(S) : ABDUZ ZAHID

It is certified that error appears in the above-identified patent and that said Letters Patent are hereby corrected as shown below:

In the printed patent, first page after the second sentence identified as follows: [76] Inventor: Abduz Zahid
2424 Jupiter Drive
Los Angeles, California
90046

Add the following sentence:

-- [73] Assignee: Greer Hydraulics, Inc.
Los Angeles, California --

Signed and Sealed this

Sixth Day of November 1979

[SEAL]

Attest:

RUTH C. MASON
Attesting Officer

LUTRELLE F. PARKER
Acting Commissioner of Patents and Trademarks